United States Patent [19]

Fister et al.

[11] Patent Number: 5,005,266
[45] Date of Patent: Apr. 9, 1991

[54] SELF-CLOSING CARABINER

[75] Inventors: Christian Fister, Lyons; Yves Grasset, Caluire, both of France

[73] Assignee: Alpcan SA, Lyons, France

[21] Appl. No.: 413,686

[22] Filed: Sep. 28, 1989

[30] Foreign Application Priority Data

Sep. 28, 1988 [FR] France ............................ 88 12924

[51] Int. Cl.⁵ ..................... A44B 13/02; B66C 1/36
[52] U.S. Cl. .................................. 24/601.5; 24/599.8; 294/82.2
[58] Field of Search ................ 24/234, 235, 233, 232, 24/241 SB, 241 P, 241 PP; 294/82.2

[56] References Cited

U.S. PATENT DOCUMENTS

| 479,026 | 7/1892 | Smeal | 24/234 |
| 1,541,991 | 6/1925 | Moody et al. | 294/82.2 |
| 1,790,056 | 1/1931 | Moody | 294/82.2 |
| 1,985,596 | 12/1934 | Burnham | 24/241 SB |
| 4,039,220 | 8/1977 | Stoops | 294/82.2 |
| 4,122,585 | 10/1978 | Sharp et al. | 294/82.2 |
| 4,440,432 | 4/1984 | Goris | 24/241 SB |

FOREIGN PATENT DOCUMENTS

| 1261402 | 2/1968 | Fed. Rep. of Germany . |
| 3347725 | 7/1985 | Fed. Rep. of Germany . |
| 8706660 | 5/1987 | Fed. Rep. of Germany . |
| 2485658 | 12/1981 | France . |

Primary Examiner—Victor N. Sakran
Attorney, Agent, or Firm—Oliff & Berridge

[57] ABSTRACT

A carabiner has a C-shaped body. At one end of the body a gate is pivotally mounted and is spring loaded to a closed position. A tongue is pivotally mounted on the body and is positioned to keep the gate open against the action of its spring loading. The tongue releases the gate to pivot to its closed position when an element to be engaged by the carabiner is introduced into the body and trips the tongue.

6 Claims, 3 Drawing Sheets

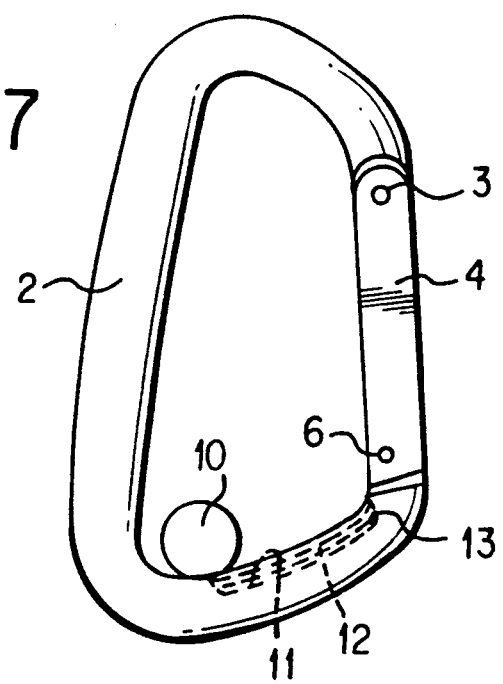
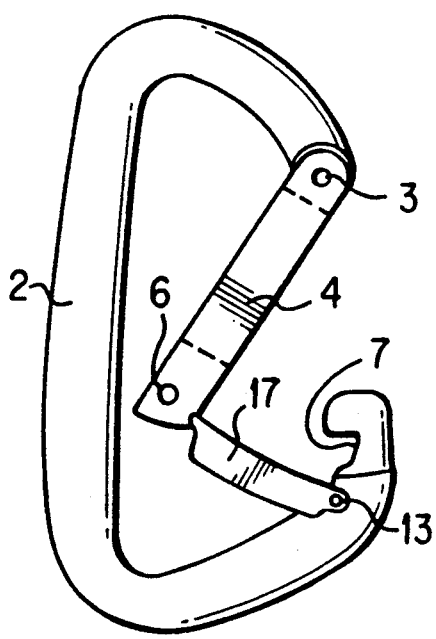
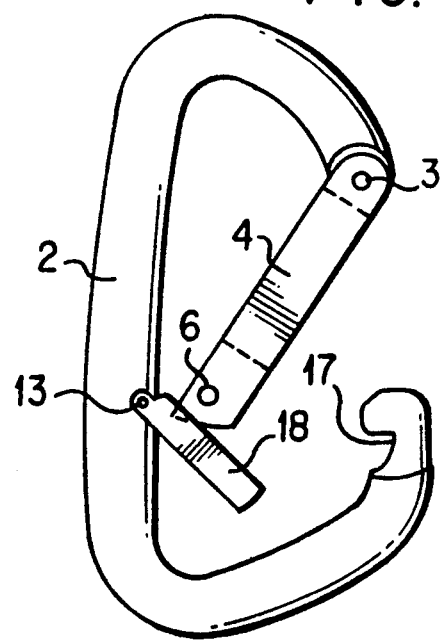

SELF-CLOSING CARABINER

Field of the Invention

The present invention relates to carabiners. More particularly, but not exclusively, it concerns a carabiner used by mountaineers or climbers who ensure their safety in the mountains with the aid of a rope.

BACKGROUND OF THE INVENTION

FIG. 1 shows a carabiner of known type, comprising a body 2 having a generally C-shape, at one end of which is a gate 4 pivoted about an axis 3. Gate 4 is urged by a spring 5 to pivot to its closed position, in which the free end engages the other end of the body. For this purpose, the gate carries a pin 6 which is received in notch 7.

When climbing, a climber must, in order to secure himself, hook a first carabiner 1a, shown in FIG. 2 to a ring 8 fixed into rock. The first carabiner 1a is connected by a strap to a second carabiner 1b of the same type. To secure himself, the climber must attach a loop of rope 10 to the second carabiner which is normally held in the closed position by a spring associated therewith. For the climber who has only one hand available for this operation, and who often is in an unstable and dangerous position, a maneuver of this kind cannot be executed without difficulty.

The object of the present invention is to provide a carabiner of the type described above, in which the hooking movement of the element to be attached to the carabiner, for example, a loop of rope, is accomplished simply and rapidly, without problems for the user.

SUMMARY OF THE INVENTION

For this purpose, a carabiner according to the invention comprises generally C-shaped body at one end of which there is a pivoted gate held in a closed position by a spring. The carabiner includes means to hold the gate in the open position, against the action of the spring, and capable of being moved in order to permit the gate to pivot to its closed position, following insertion into the body of an element to be held by the carabiner.

In practice, the carabiner which is to receive the element to be held, for example a loop of rope, is prepared so that its gate is held in the open position. With the gate in this open position, the end of the body on which the gate is not pivoted forms a hook to which the loop of rope can be rapidly attached. During this attachment of the loop to the hook, the loop actuates the means for holding the gate in the open position, causing retraction of the holding means, so that the gate automatically pivots to the closed position.

According to a preferred embodiment of carabiner, the means to hold the gate in the open position comprises a tongue hinged at one of its ends to the body for pivoting about an axis parallel to the axis of pivoting of the gate. The tongue normally lays flat against the body or is received in a recess in the body. The tongue includes a part designed to cooperate with the free end of the gate in order to hold the latter in the open position.

Thus it is the direct action of the loop of rope, or other element to be attached, on the tongue which causes the latter to pivot and consequently free the gate to assume its closed position.

The tongue can be pivotally mounted within a groove provided in the body so as to retract completely inside the latter or it can have a cross-sectional shape conforming to the cross-sectional shape to the body so that it can lay flat against the body.

The tongue can be pivotally mounted close to the end of the body opposite to that at which the gate is pivoted or can be mounted at a central part of the body. In both cases, the tongue and the free end of the gate have means of interengagement when they are in contact with one another for holding them in open position, pivoted toward the inside of the carabiner.

The invention is further explained in the following description and drawings, which show preferred embodiments of this carabiner.

DESCRIPTION OF THE DRAWINGS

FIGS. 5 to 7 are three views of a portion of FIG. 4, corresponding to three phases of operation of the carabiner;

FIG. 8 is a view of a second embodiment of the carabiner; and

FIG. 9 is a side view of another embodiment of carabiner.

DESCRIPTION OF PREFERRED EMBODIMENTS

Figure 1:
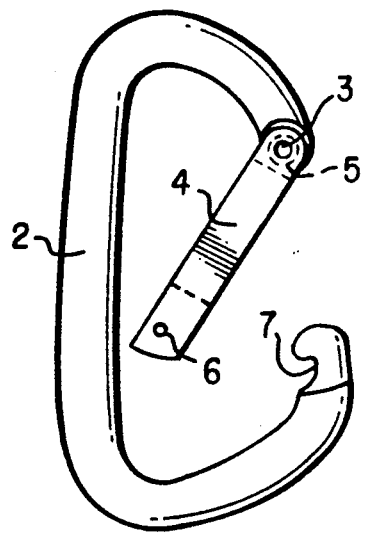
FIG. 1 is a side view of a traditional carabiner.
Figure 2:
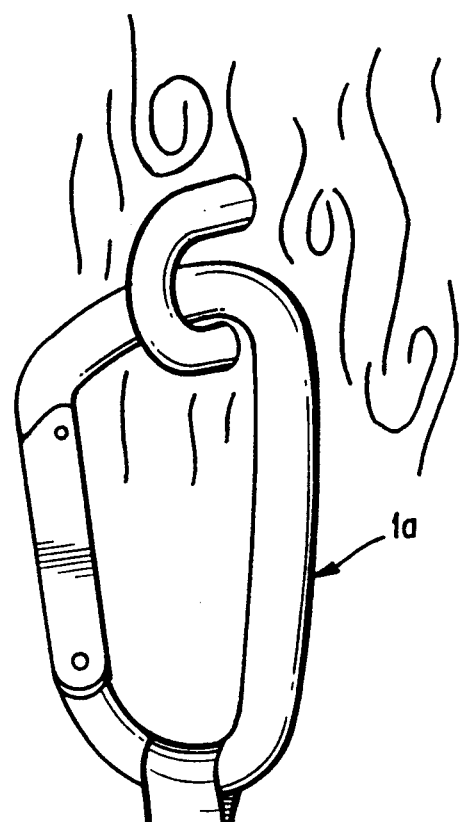
FIG. 2 is a side view of two traditional carabiners, connected by a strap when used to secure a climber.
Figure 3:
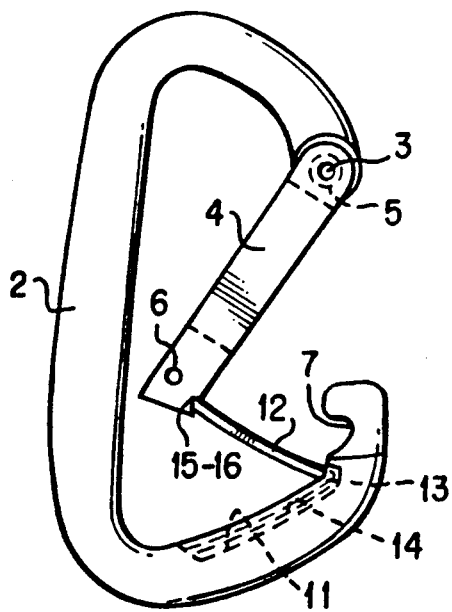
FIG. 3 is a side view of a first embodiment of the carabiner according to the invention.
Figure 3:
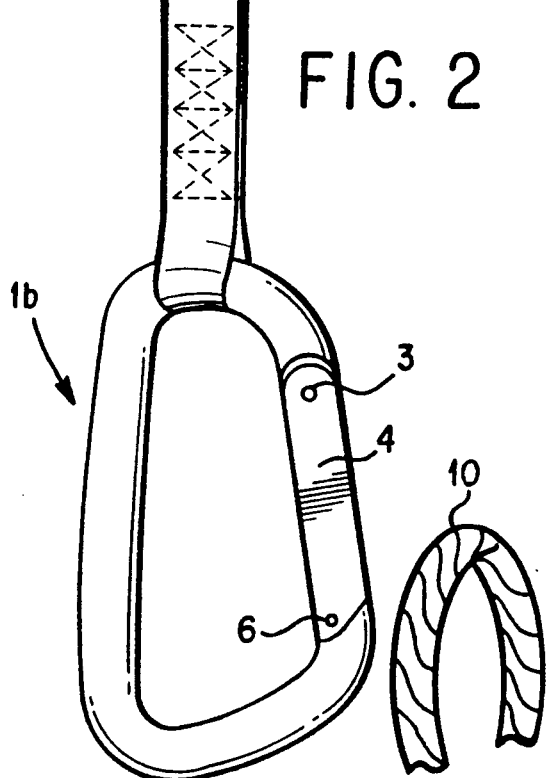

The carabiner shown in FIG. 3 is of the general type of carabiner shown in FIGS. 1 and 2, with the same elements being designated by the same reference numbers as in those figures.

A preferred form of carabiner has, in the part adjacent to the end of the body on which the gate is not pivoted, a groove 11 recessed into the inside of the body. A small tongue 12 is mounted for pivoting around an axis 13 parallel to the axis 3 about which the gate 4 is pivoted. Tongue 12 is pivoted at its end located near the opening of the carabiner. The tongue is also associated with a spring 14, which normally keeps the tongue retracted inside groove 11.

The length of tongue 12 is such that when it is swiveled toward the inside of the carabiner, its end comes in contact with the end of gate 4 which is pivoted toward the inside of the carabiner.

The free end of tongue 12 is in the shape of a fork 15 designed to engage a recess 16 provided near the end of gate 4. Under these conditions it is possible, by cooperation of the ends of gate 4 and tongue 12, to ensure that these two elements are held pivoted toward the inside of the carabiner, against the action of the springs with which they are respectively associated.

Figure 5:
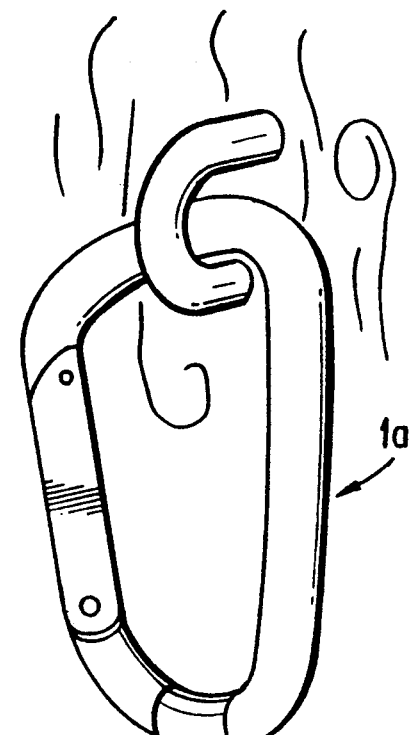
Figure 5:
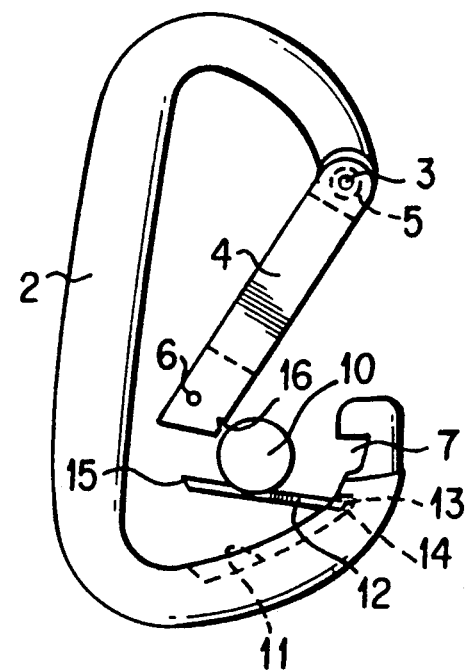
Figure 4:
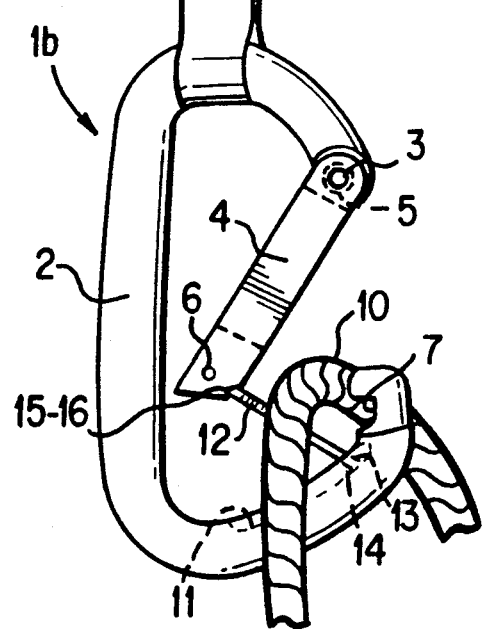
FIG. 4 is a view similar to FIG. 2, showing two carabiners connected together to secure a climber.
Figure 6:
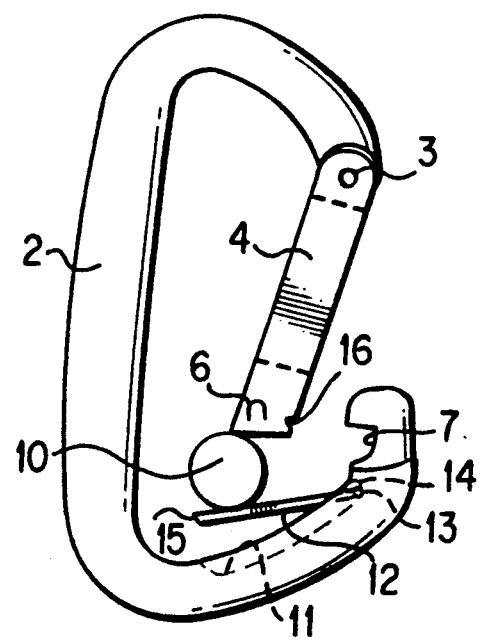

The use of such a carabiner by a climber is shown in FIGS. 4 to 7. Carabiner 1b, on which loop of rope 10 is to be engaged, is prepared as shown in FIG. 4 so that gate 4 is pivoted inwardly. One of the ends of the body of the carabiner thus forms a hook to which the climber can very easily attach a loop of rope 10, as shown in FIG. 4. In the course of this movement, the loop of rope comes in contact with tongue 12, causing it to pivot relative to gate 4, as shown in FIGS. 5 and 6. Under the action of the springs 5 and 14 associated with gate 4 and tongue 12, respectively, gate 4 freely pivots toward its closed position and tongue 12 pivots toward its retracted position, so that the carabiner takes the form shown in FIG. 7 in which it fulfills the same function as a traditional carabiner.

It is important to note the simplicity of operation for the user, since the latter has not been required to pivot gate 4 inward in order to attach the loop of rope to the carabiner.

FIG. 8 shows a variation of this carabiner in which tongue 17 has a cross-section, for example an arcuate one, which fits closely about the body of the carabiner, rather than being received in a recess as shown in FIG. 3.

FIG. 9 shows a variation in which tongue 18 is pivoted on a central portion of the body. In this case also, the free end of the gate and tongue 18 have complementary hollow and raised contact elements for maintaining the gate in open position toward the inside of the carabiner when the tongue is in contact with the gate.

The invention is not limited to these specific embodiments and has uses other than mountaineering.

What is claimed is:

1. A carabiner comprising a body in the general shape of a C, a gate, means for pivotally mounting the gate on one end of the body, biasing means for holding the gate in a closed position, means for holding the gate in an open position against the action of the biasing means and for allowing the gate to pivot toward its closed position following the introduction into the body of an element to be hooked, wherein the means for holding the gate in the open position comprises a tongue, means for pivotally mounting one end of the tongue on the body for pivoting around an axis parallel to the axis of pivoting of the gate, and the tongue having a part cooperating with the free end of the gate to hold the gate in the open position.

2. A carabiner according to claim 1, wherein the tongue is pivotally mounted inside a groove in the body, the tongue being shaped to be received in the groove.

3. A carabiner according to claim 1, wherein the cross-section of the tongue is of substantially the same cross-sectional shape as the body, said tongue being pivotally mounted on the exterior of the body and designed to fit over a portion of the latter when in the retracted position.

4. A carabiner according to claim 1, wherein the tongue is pivotally mounted on the end of the body opposite to the end on which the gate is pivotally mounted; and engagement means near the free ends of the tongue and the gate for cooperatively holding the tongue and gate in open condition.

5. A carabiner according claim 1, wherein the tongue is pivotally mounted on a central part of the body, said tongue and gate having cooperative engagement means for holding the tongue and the gate in open position when pivoted toward the inside of the body.

6. A carabiner according claim 1, and further comprising biasing means for holding the tongue in a retracted position.

* * * * *